US012378060B2

(12) United States Patent
Bellamah et al.

(10) Patent No.: US 12,378,060 B2

(45) Date of Patent: *Aug. 5, 2025

(54) BOX BLANK

(71) Applicant: Altria Client Services LLC, Richmond, VA (US)

(72) Inventors: Stephen Bellamah, Richmond, VA (US); James S. Bigelow, Midlothian, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,971

(22) Filed: Jun. 28, 2024

(65) Prior Publication Data

US 2024/0343470 A1 Oct. 17, 2024

Related U.S. Application Data

(63) Continuation of application No. 18/318,837, filed on May 17, 2023, now Pat. No. 12,037,182, which is a (Continued)

(51) Int. Cl.

*B31B 50/00* (2017.01)
*B31B 50/81* (2017.01)

(Continued)

(52) U.S. Cl.

CPC .............. *B65D 85/10* (2013.01); *B31B 50/00* (2017.08); *B31B 50/81* (2017.08); *B65B 5/06* (2013.01); *B65D 5/02* (2013.01); *B65D 5/16* (2013.01); *B65D 5/4266* (2013.01); *B65D 5/4295* (2013.01); *B65D 5/566* (2013.01);

(Continued)

(58) Field of Classification Search

CPC ....................... B65D 75/5894; B65D 85/1018; B65D 85/10; B65D 77/003; B65D 75/68; B65D 75/5855; B65D 5/5485; B65D 5/543; B65D 85/1036; B65D 77/02; B65D 85/1045

USPC ..... 229/120, 160.1, 203; 206/259, 268, 273, 206/265, 271, 274, 245, 774

See application file for complete search history.

(56) References Cited

U.S. PATENT DOCUMENTS 2,023,386 A 12/1935 Geerlings
2,958,418 A 11/1960 O'Gorman (Continued)

FOREIGN PATENT DOCUMENTS

DE 102011119344 A1 * 4/2013 ........... B65B 19/025
EP 2471725 A1 7/2012

(Continued)

OTHER PUBLICATIONS

Extended European Search Report regarding EP Patent Application No. EP23157614 dated Jul. 22, 2024.

(Continued)

*Primary Examiner* — Christopher R Demeree

(74) *Attorney, Agent, or Firm* — Harness, Dickey & Pierce, P.L.C.

(57) ABSTRACT

A box blank useful for forming a container includes a first layer including paperboard, a second layer including a paper layer and a foil layer, and an adhesive layer adhering the first layer to the second layer. The foil layer is between the paperboard and the paper layer.

20 Claims, 11 Drawing Sheets

Related U.S. Application Data continuation of application No. 17/665,825, filed on Feb. 7, 2022, now Pat. No. 11,820,547, which is a continuation of application No. 16/222,051, filed on Dec. 17, 2018, now Pat. No. 11,267,645, which is a continuation of application No. 15/420,862, filed on Jan. 31, 2017, now Pat. No. 10,155,617, which is a continuation of application No. 15/292,913, filed on Oct. 13, 2016, now Pat. No. 10,124,953.

(51) Int. Cl.

| | |
|---|---|
| ***B31B 105/00*** | (2017.01) |
| ***B65B 5/06*** | (2006.01) |
| ***B65D 5/02*** | (2006.01) |
| ***B65D 5/16*** | (2006.01) |
| ***B65D 5/42*** | (2006.01) |
| ***B65D 5/56*** | (2006.01) |
| ***B65D 5/62*** | (2006.01) |
| ***B65D 5/66*** | (2006.01) |
| ***B65D 65/02*** | (2006.01) |
| ***B65D 77/02*** | (2006.01) |
| ***B65D 77/04*** | (2006.01) |
| ***B65D 77/32*** | (2006.01) |
| ***B65D 85/10*** | (2006.01) |

(52) U.S. Cl.

CPC ............ *B65D 5/62* (2013.01); *B65D 5/6602* (2013.01); *B65D 65/02* (2013.01); *B65D 77/02* (2013.01); *B65D 77/042* (2013.01); *B65D 77/32* (2013.01); *B65D 85/1027* (2013.01); *B65D 85/1045* (2013.01); *B65D 85/10568* (2020.05); *B31B 2105/00* (2017.08)

(56) References Cited

U.S. PATENT DOCUMENTS

| | | | |
|---|---|---|---|
| 2,963,213 | A | 12/1960 | Nauman |
| 2,984,384 | A | 5/1961 | Jackson |
| 3,265,287 | A | 8/1966 | Hovland |
| 3,325,077 | A | 6/1967 | Becker et al. |
| 3,425,324 | A | 2/1969 | Becker et al. |
| 3,558,036 | A | 1/1971 | DeVoe |
| 3,606,139 | A | 9/1971 | Arscott |
| 3,996,945 | A | 12/1976 | McDowell |
| 4,264,662 | A | 4/1981 | Taylor et al. |
| 4,293,068 | A | 10/1981 | Focke et al. |
| 4,300,646 | A | 11/1981 | Melcher et al. |
| 4,300,676 | A | 11/1981 | Focke et al. |
| 4,349,402 | A | 9/1982 | Parker |
| 4,375,260 | A | 3/1983 | Focke et al. |
| 4,555,027 | A | 11/1985 | Froom |
| 4,607,748 | A | 8/1986 | Focke |
| 4,685,610 | A | 8/1987 | Carter et al. |
| 4,699,833 | A | 10/1987 | Instance |
| 4,712,689 | A | 12/1987 | Froom |
| 4,720,423 | A | 1/1988 | Fraser |
| 4,763,779 | A | 8/1988 | Focke et al. |
| 4,771,882 | A | 9/1988 | Lowe et al. |
| 4,927,076 | A | 5/1990 | Simpson |
| 4,942,961 | A | 7/1990 | Focke et al. |
| 5,018,625 | A | 5/1991 | Focke et al. |
| 5,022,950 | A | 6/1991 | Ingalls et al. |
| 5,080,227 | A | 1/1992 | Focke |
| 5,096,113 | A | 3/1992 | Focke |
| 5,158,664 | A | 10/1992 | Colgan |
| 5,788,065 | A | 8/1998 | Focke |
| 5,914,165 | A | 6/1999 | Freedman |
| 6,000,539 | A | 12/1999 | Stewart-Cox et al. |
| 6,132,349 | A | 10/2000 | Yokoyama |
| 6,164,444 | A | 12/2000 | Bray |
| 6,207,242 | B1 | 3/2001 | Hoffman |
| 6,230,968 | B1 | 5/2001 | Varadarajan |
| 6,237,760 | B1 | 5/2001 | Parker et al. |
| 6,254,938 | B1 | 7/2001 | Pranevicius et al. |
| 6,478,149 | B1 | 11/2002 | Parker |
| 6,481,259 | B1 | 11/2002 | Durney |
| 6,505,735 | B1 | 1/2003 | Parker |
| 6,606,840 | B2 | 8/2003 | Focke et al. |
| 6,736,262 | B2 | 5/2004 | Focke |
| 6,874,623 | B2 | 4/2005 | Bray |
| 6,877,349 | B2 | 4/2005 | Durney et al. |
| 6,974,406 | B2 | 12/2005 | Antonacci |
| 7,353,940 | B2 | 4/2008 | Sendo |
| 7,533,773 | B2 | 5/2009 | Aldridge |
| 7,827,769 | B2 | 11/2010 | Bertuzzi |
| 7,862,869 | B2 | 1/2011 | Papenfuss et al. |
| 8,091,703 | B2 | 1/2012 | Marchetti et al. |
| 8,123,030 | B2 | 2/2012 | Hein |
| 8,276,750 | B2 | 10/2012 | Biondi et al. |
| 8,418,845 | B2 | 4/2013 | Tawada et al. |
| 8,474,612 | B2 | 7/2013 | Bertuzzi et al. |
| 8,556,072 | B2 | 10/2013 | Bertuzzi et al. |
| 8,579,108 | B2 | 11/2013 | Tanbo et al. |
| 8,590,701 | B2 | 11/2013 | Bertuzzi et al. |
| 8,671,648 | B2 | 3/2014 | Bertuzzi et al. |
| 8,783,454 | B2 | 7/2014 | Igo |
| 8,827,145 | B2 | 9/2014 | Hultberg |
| 9,033,141 | B2 | 5/2015 | Ghini et al. |
| 9,089,165 | B2 | 7/2015 | Bertuzzi et al. |
| 9,254,938 | B2 | 2/2016 | Iwata |
| 9,359,124 | B2 | 6/2016 | Lutzig |
| 9,382,062 | B2 | 7/2016 | Mitten et al. |
| 9,499,331 | B2 | 11/2016 | Seyfferth |
| 9,533,821 | B2 | 1/2017 | Buse |
| 9,714,134 | B2 | 7/2017 | Tacchi |
| 10,053,273 | B2 | 8/2018 | Petrucci et al. |
| 10,124,953 | B2 | 11/2018 | Bellamah et al. |
| 10,155,617 | B2 | 12/2018 | Bellamah et al. |
| 10,266,335 | B2 | 4/2019 | Krasiev et al. |
| 10,414,580 | B2 | 9/2019 | Buse et al. |
| D863,953 | S | 10/2019 | Schnakenberg et al. |
| 10,427,865 | B2 | 10/2019 | Eggen |
| 10,661,975 | B2 | 5/2020 | Slooff et al. |
| 10,787,309 | B2 | 9/2020 | Draghetti et al. |
| 10,865,037 | B2 | 12/2020 | Hafker et al. |
| 10,968,034 | B2 | 4/2021 | Rodrigues |
| 10,994,874 | B2 | 5/2021 | Franzen et al. |
| 11,267,645 | B2 | 3/2022 | Bellamah et al. |
| 2005/0041889 | A1 | 2/2005 | Scarberry |
| 2005/0130822 | A1 | 6/2005 | Rath |
| 2006/0011504 | A1 | 1/2006 | Gosebruch et al. |
| 2006/0011540 | A1 | 1/2006 | Pressley et al. |
| 2006/0021883 | A1 | 2/2006 | Focke et al. |
| 2006/0037876 | A1 | 2/2006 | Fath et al. |
| 2006/0231431 | A1 | 10/2006 | Tambo |
| 2008/0128301 | A1 | 6/2008 | Bourgoin et al. |
| 2008/0230410 | A1 | 9/2008 | Jones et al. |
| 2009/0071852 | A1 | 3/2009 | Negrini |
| 2009/0177717 | A1 | 7/2009 | Meehan et al. |
| 2009/0184158 | A1 | 7/2009 | Lutzig et al. |
| 2009/0188818 | A1 | 7/2009 | Moore |
| 2009/0308766 | A1 | 12/2009 | Polloni et al. |
| 2010/0163563 | A1 | 7/2010 | Lutzig |
| 2011/0062037 | A1 | 3/2011 | Bertuzzi et al. |
| 2011/0114518 | A1 | 5/2011 | Hein |
| 2011/0180432 | A1 | 7/2011 | Blick et al. |
| 2012/0006823 | A1 | 1/2012 | Bertuzzi et al. |
| 2012/0111746 | A1 | 5/2012 | Tanbo et al. |
| 2012/0177307 | A1 | 7/2012 | Duan et al. |
| 2012/0241339 | A1 | 9/2012 | Buse |
| 2012/0291401 | A1 | 11/2012 | Mitten et al. |
| 2013/0101855 | A1 | 4/2013 | Cham et al. |
| 2013/0233911 | A1 | 9/2013 | Robert et al. |
| 2013/0334293 | A1 | 12/2013 | Coatney et al. |
| 2014/0054300 | A1 | 2/2014 | Gilpatrick et al. |
| 2014/0079343 | A1 | 3/2014 | Lyzenga et al. |
| 2014/0110286 | A1 | 4/2014 | Bertuzzi et al. |
| 2014/0305997 | A1 | 10/2014 | Olsson et al. |
| 2014/0374290 | A1 | 12/2014 | Seyfferth De Oliveira |
| 2015/0021219 | A1 | 1/2015 | Seyfferth De Oliveira |
| 2015/0034509 | A1 | 2/2015 | Seyfferth De Oliveira |

(56) References Cited

U.S. PATENT DOCUMENTS

| | | | |
|---|---|---|---|
| 2015/0041345 | A1 | 2/2015 | Kerkar |
| 2015/0041346 | A1 | 2/2015 | Seyfferth De Oliveira |
| 2015/0259132 | A1 | 9/2015 | Bernardo et al. |
| 2015/0320111 | A1 | 11/2015 | Slooff |
| 2015/0375923 | A1 | 12/2015 | Pilzecker |
| 2016/0236855 | A1 | 8/2016 | Chatelain et al. |
| 2016/0280451 | A1 | 9/2016 | Mitten et al. |
| 2016/0368645 | A1 | 12/2016 | Buse |
| 2017/0036849 | A1 | 2/2017 | Mitten et al. |
| 2017/0152100 | A1 | 6/2017 | Polloni et al. |
| 2017/0203910 | A1 | 7/2017 | Buse et al. |
| 2017/0275082 | A1 | 9/2017 | Krasiev et al. |
| 2017/0327303 | A1 | 11/2017 | Krasiev et al. |
| 2017/0334634 | A1 | 11/2017 | Bray et al. |
| 2017/0341852 | A1 | 11/2017 | Bray et al. |
| 2018/0024375 | A1 | 1/2018 | Tobioka |
| 2018/0339846 | A1 | 11/2018 | Eggen |

FOREIGN PATENT DOCUMENTS

| | | | | |
|---|---|---|---|---|
| EP | 3009374 A1 | 4/2016 | | |
| JP | 2004347706 A | 12/2004 | | |
| WO | 99/28212 A1 | 6/1999 | | |
| WO | 02079051 A1 | 10/2002 | | |
| WO | 2008142540 A1 | 11/2008 | | |
| WO | 2011/009520 A1 | 1/2011 | | |
| WO | 2013120916 A1 | 8/2013 | | |
| WO | 2014195008 A2 | 12/2014 | | |
| WO | 2015181522 A1 | 12/2015 | | |
| WO | 2016059077 A1 | 4/2016 | | |
| WO | 2016087819 A1 | 6/2016 | | |
| WO | 2016102461 A1 | 6/2016 | | |
| WO | WO-2016083608 A1 * | 6/2016 | ......... | B65D 85/1045 |
| WO | 2017002002 A1 | 1/2017 | | |
| WO | 2018/023475 A1 | 2/2018 | | |
| WO | 2018024375 A1 | 2/2018 | | |
| WO | 2018059729 A1 | 4/2018 | | |
| WO | 2018/210832 A1 | 11/2018 | | |

OTHER PUBLICATIONS

Extended European Search Report dated Apr. 12, 2018 in corresponding European Patent Application No. 17196271.5-1016 (9 pages).

International Search Report and Written Opinion dated Apr. 23, 2018 in corresponding International Patent Application No. PCT/US2018/020127, (13 pages).

International Search Report and Written Opinion dated Feb. 14, 2018 in corresponding International Patent Application No. PCT/US2017/056272, 12 pages.

International Search Report and Written Opinion dated Feb. 14, 2018 in corresponding International Patent Application No. PCT/US2017/056272, 15 pages.

International Search Report and Written Opinion dated Apr. 23, 2018 in corresponding International Patent Application No. PCT/US2018/020127, 12 pages.

Third Party Observation dated Nov. 16, 2018 in corresponding International Patent Application No. PCT/US2018/020127, 4 pages.

Third Party Observation dated Oct. 11, 2019 in corresponding European Patent Application No. 17860004.5, 3 pages.

Extended European Search Report dated Aug. 19, 2019 in corresponding European Patent Application No. 17860004.5, 10 pages.

International Search Report and Written Opinion dated Apr. 23, 2017 in corresponding International Patent Application No. PCT/US2018/020127, (13 pages).

Official Action dated May 11, 2020 in corresponding European Patent Application No. 18 710 976.4-1016, 4 pages.

Official Action dated May 18, 2020 in corresponding European Patent Application No. 17 196 271.5-1016, 4 pages.

Third Party Observation dated Nov. 18, 2018 in corresponding International Patent Application No. PCT/US2018/020127, 4 pages.

Third Party Observation mailed Oct. 11, 2019 in corresponding European Patent Application No. 17860004.5, 3 pages.

Extended European Search Report mailed Aug. 19, 2019 in corresponding European Patent Application No. 17860004.5, 10 pages.

Third Party Observation mailed Nov. 16, 2018 in corresponding International Patent Application No. PCT/US2018/020127, 4 pages.

International Search Report and Written Opinion mailed Apr. 23, 2018 in corresponding International Patent Application No. PCT/US2018/020127, 12 pages.

U.S. Notice of Allowance dated Dec. 30, 2020 for corresponding U.S. Appl. No. 16/791,192.

Third Party Observation dated Februry 17, 2021 for corresponding European Application No. 18710976.4.

European Communication dated Feb. 19, 2021 for corresponding European Application No. 18710976.4.

Third Party Observation dated Feb. 20, 2019 from corresponding European Application No. 20170196271.

Third Party Observations dated Jun. 6, 2019 from corresponding European Application No. 20170196271.

Third Party Observations dated Aug. 7, 2019 from corresponding European Application No. 20170196271.

Notice of Deficiencies dated Nov. 21, 2019 from corresponding European Application No. 20170196271.

Third Party Observations dated Jan. 30, 2020 from corresponding European Application No. 20170196271.

Notice of Deficiencies dated May 18, 2020 from corresponding European Application No. 20170196271.

International Preliminary Report on Patentability dated Jan. 11, 2019 from corresponding European Application No. 20170860004.

European Search Report dated Mar. 1, 2021 for corresponding European Application No. 20206991.0.

U.S. Notice of Allowance dated Mar. 31, 2021 for corresponding U.S. Appl. No. 16/791,192.

U.S. Notice of Allowance dated Jun. 17, 2021 for corresponding U.S. Appl. No. 16/222,051.

Non-Final Office Action dated Jun. 18, 2021 for U.S. Appl. No. 16/943,151.

Official Action dated Aug. 19, 2021 in corresponding European Patent Application No. 18 710 976.4, four pages.

U.S. Notice of Allowance dated Sep. 22, 2021 in U.S. Appl. 16/943,151 (7 pages).

U.S. Notice of Allowance dated Oct. 18, 2021 for U.S. Appl. No. 16/222,051 (6 pages).

Extended European Search Report for corresponding European patent application No. 21211702.2 dated Jul. 6, 2022.

Non-Final Office Action dated Jul. 20, 2022 for U.S. Appl. No. 17/498,054.

U.S. Office Action dated Nov. 2, 2022 for corresponding U.S. Appl. No. 17/665,825.

U.S. Notice of Allowance dated Jan. 27, 2023 for U.S. Appl. No. 17/588,456 (5 pages).

U.S. Office Action dated Feb. 2, 2023 for corresponding U.S. Appl. No. 17/498,054.

U.S. Notice of Allowance dated Feb. 16, 2023 for corresponding U.S. Appl. No. 17/665,825.

Extended European Search Report dated Mar. 30, 2023 for corresponding European patent application No. 22185099.3.

U.S. Notice of Allowance dated May 26, 2023 for U.S. Appl. No. 17/498,054 (8 pages).

U.S. Notice of Allowance dated Jun. 7, 2023 for U.S. Appl. No. 17/498,054 (5 pages).

U.S. Notice of Allowance dated Jul. 27, 2023 for U.S. Appl. No. 17/665,825 (8 pages).

U.S. Office Action dated Nov. 3, 2023, for U.S. Appl. No. 18/305,473.

U.S. Office Action dated Nov. 28, 2023 issued in U.S. Appl. No. 18/318,837.

Notice of Allowance regarding corresponding U.S. Appl. No. 18/305,473, dated Feb. 5, 2024.

Notice of Allowance dated Mar. 21, 2024, issued in corresponding U.S. Appl. No. 18/318,837.

U.S. Office Action dated Apr. 22, 2023 issued in corresponding U.S. Appl. No. 18/465,397.

(56) References Cited

OTHER PUBLICATIONS

U.S. Notice of Allowance dated Aug. 7, 2024 for corresponding U.S. Appl. No. 18/465,397.

* cited by examiner

BOX BLANK

RELATED APPLICATIONS

This application is a continuation application of U.S. patent application Ser. No. 18/318,837, filed May 17, 2023, which is a continuation application of U.S. patent application Ser. No. 17/665,825, filed Feb. 7, 2022, which is a continuation application of U.S. patent application Ser. No. 16/222,051, filed Dec. 17, 2018, which is a continuation application of U.S. patent application Ser. No. 15/420,862, filed Jan. 31, 2017, entitled "Box In A Box Re-Sealable Cigarette Pack" which is a continuation application of U.S. patent application Ser. No. 15/292,913, filed Oct. 13, 2016, which issued as U.S. Pat. No. 10,124,953 on Nov. 13, 2018, the entire contents of each of which are incorporated by reference herein.

FIELD

The present disclosure relates to a package for consumer goods and particularly to a re-sealable cigarette pack.

BACKGROUND

Numerous approaches have been made for packaging consumer goods. In the case of cigarettes, for example, packages are designed to preserve the flavor and freshness of the consumer goods and also protect the goods from contamination. Known packages employ outer containers having a hinged lid providing access to an inner container with an opening for accessing the consumer goods. The outer containers are generally formed of a rigid paperboard, cardboard, or other suitable material. The inner container is generally formed of a material or combination of materials having substantially less rigidity than the outer container. For example, the inner container is known to be formed of paperboard, packing material, paper, and/or aluminium. In known designs, a label with a tacky substance for sealing and re-sealing can be used to cover the opening of the inner container.

SUMMARY

In one example, a box blank useful for forming a container comprises a first layer comprising paperboard, a second layer comprising a paper layer and a foil layer, and an adhesive layer adhering the first layer to the second layer, wherein the foil layer is between the paperboard and the paper layer.

In another example, a box blank useful for forming a container comprises a first layer comprising paperboard, a second layer comprising a paper layer and a foil layer, and an adhesive layer adhering the first layer to the second layer, wherein the foil layer is between the paperboard and the paper layer, the box blank including fold lines defining a top front panel, a bottom front panel, a top panel, a back panel, and a bottom panel. The box blank can be sized to form a cigarette pack.

In a further example, a box blank useful for forming a container comprises a first layer comprising paperboard, a second layer comprising a paper layer and a foil layer, and an adhesive layer adhering the first layer to the second layer, wherein the foil layer is between the paperboard and the paper layer, the box blank including fold lines defining a top front panel, a bottom front panel, a top front panel, a bottom front panel, a back panel, a bottom panel, and side panels, wherein the top front panel is separated from the top panel by a first transverse fold line of the fold lines, the back panel is separated from the top panel by a second transverse fold line of the fold lines, the bottom panel is separated from the back panel by a third transverse fold line of the fold lines, and the bottom front panel is separated from the bottom panel by a fourth transverse fold line of the fold lines, the side panels include a first side panel and a second side panel, and wherein the first side panel is separated from the back panel by a first longitudinal fold line of the fold lines, and the second side panel is separated from the back panel by a second longitudinal fold line of the fold lines. The second layer can further comprise a second adhesive layer adhering the paper layer to the foil layer and/or a third layer comprising a polypropylene film can be located on a side of the first layer opposite the second layer.

BRIEF DESCRIPTION OF THE DRAWING FIGURES

The scope of the present disclosure is best understood from the following detailed description of embodiments when read in conjunction with the accompanying drawings.

FIG. 1 illustrates an exploded view of a container for consumer goods in accordance with an embodiment of the present disclosure.

FIGS. 2*a* and 2*b* illustrate perspective views of a layer structure of the container in accordance with an embodiment of the present disclosure.

FIGS. 3*a*-3*c* illustrate a first pull tab of the container in accordance with an embodiment of the present disclosure.

FIGS. 4*a*-4*c* illustrate a second pull tab of the container in accordance with an embodiment of the present disclosure.

Figure 7A:
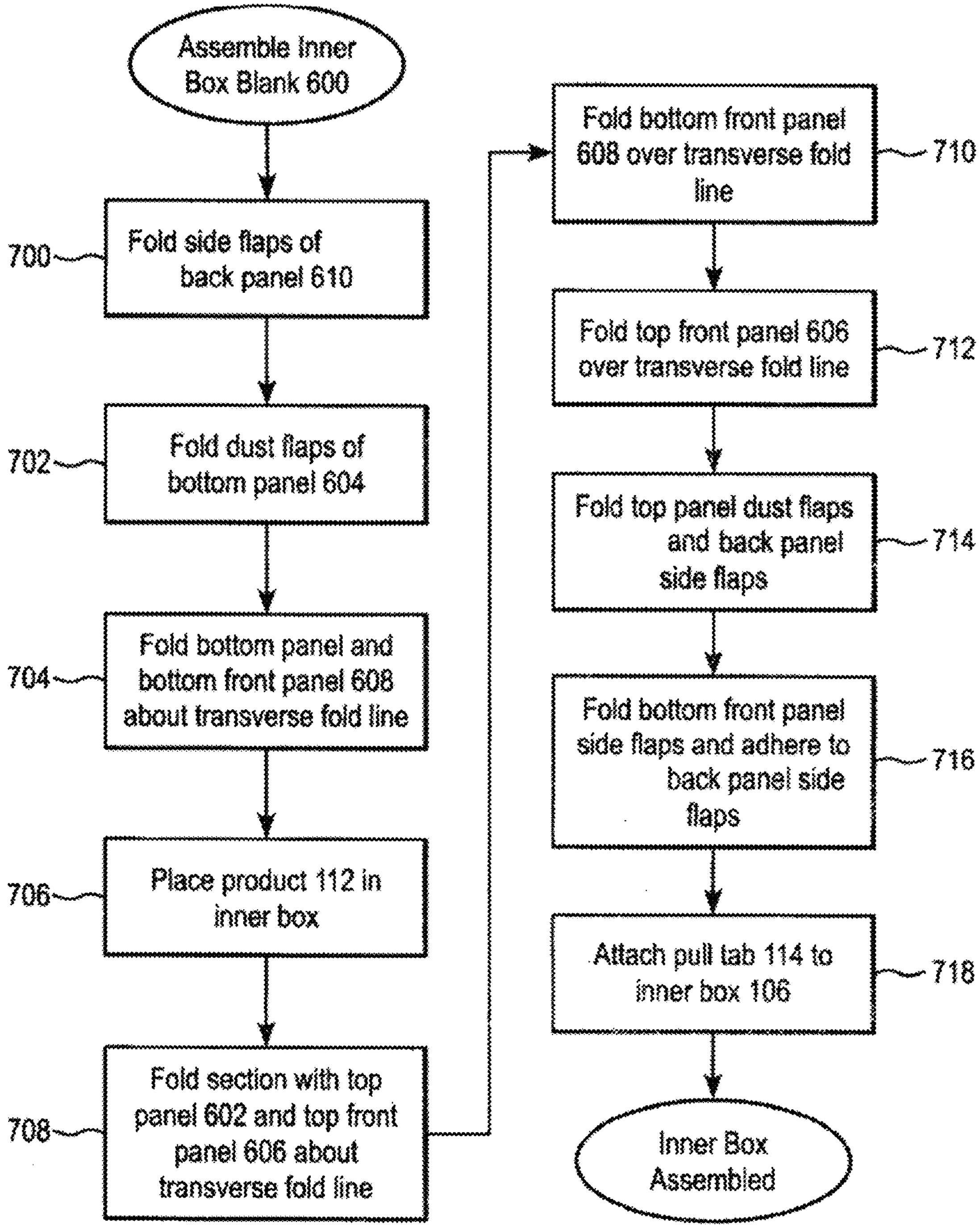
Figure 7B:
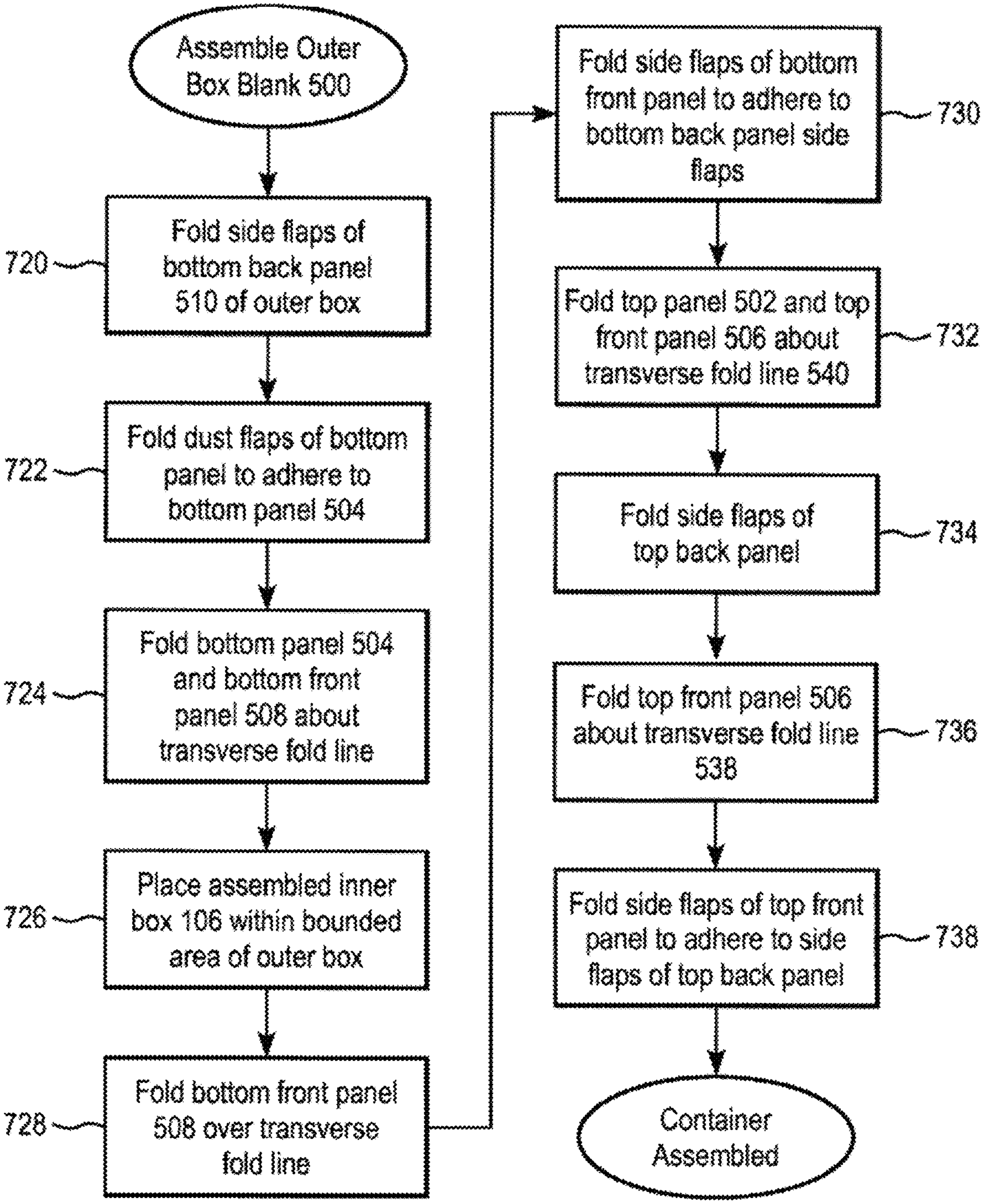

FIGS. 7*a* and 7*b* is a flow chart of a process for assembling the container in accordance with an embodiment of the present disclosure.

Figure 8:
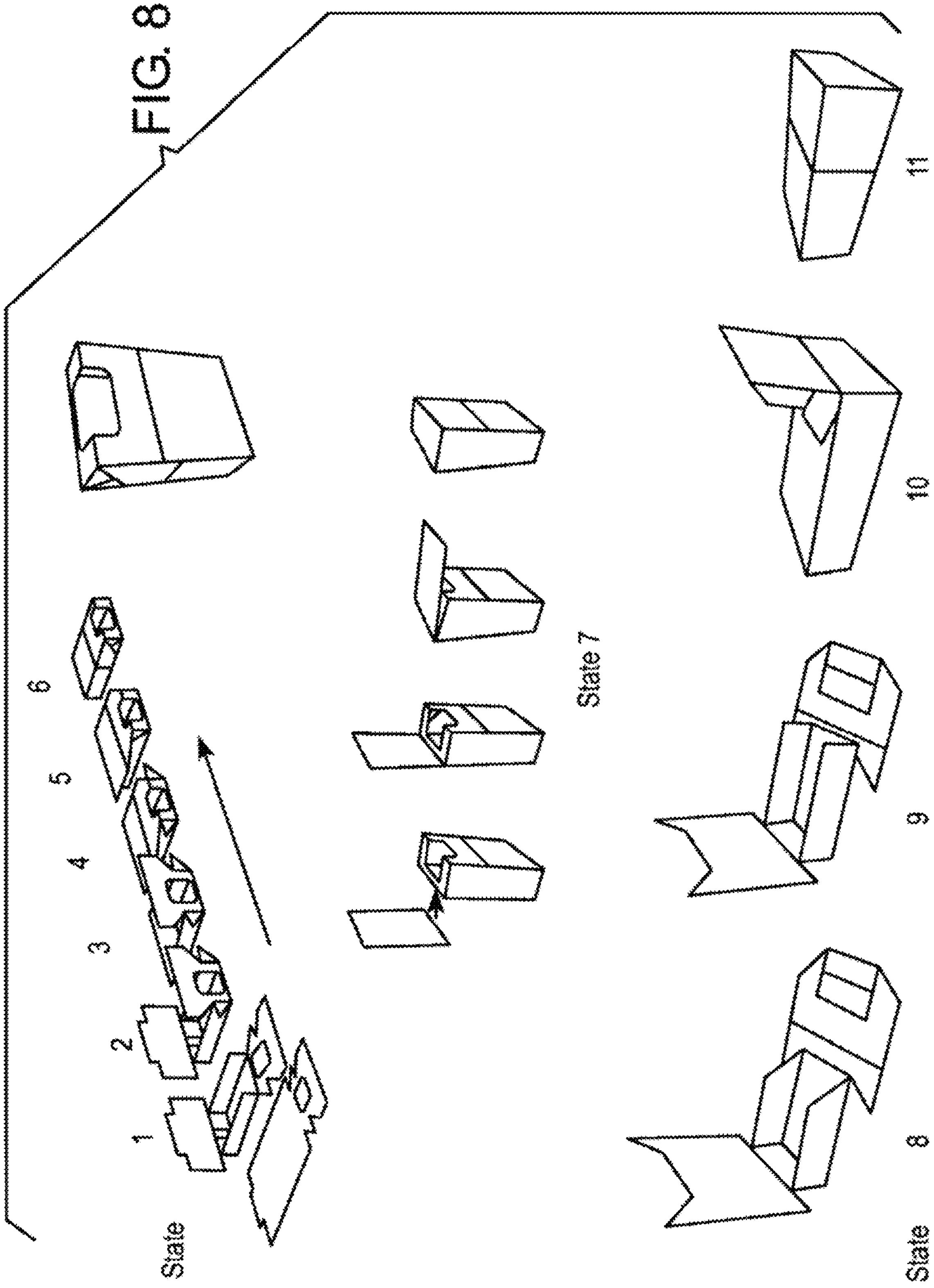

FIG. 8 illustrates a sequence of assembly states of the container according to the assembly process of FIGS. 7*a* and 7*b*.

Figure 9A:
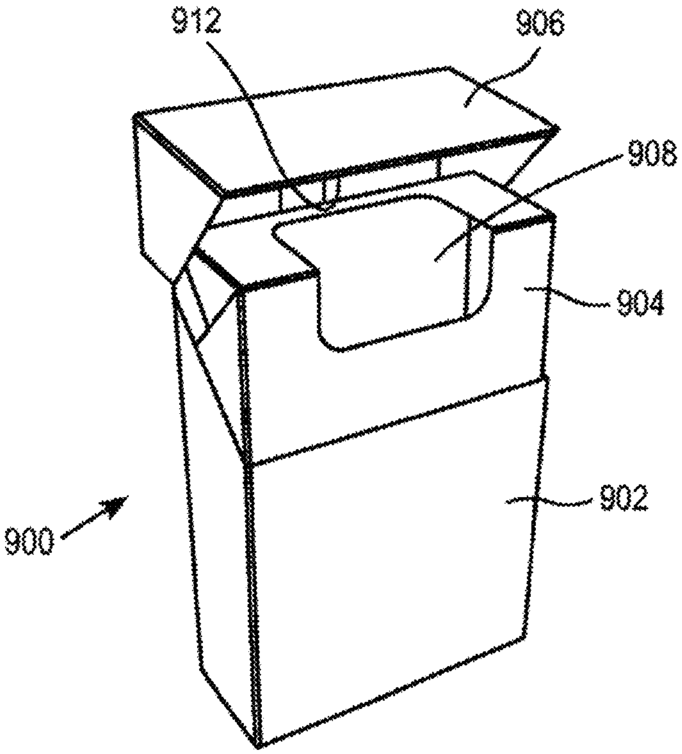
Figure 9B:
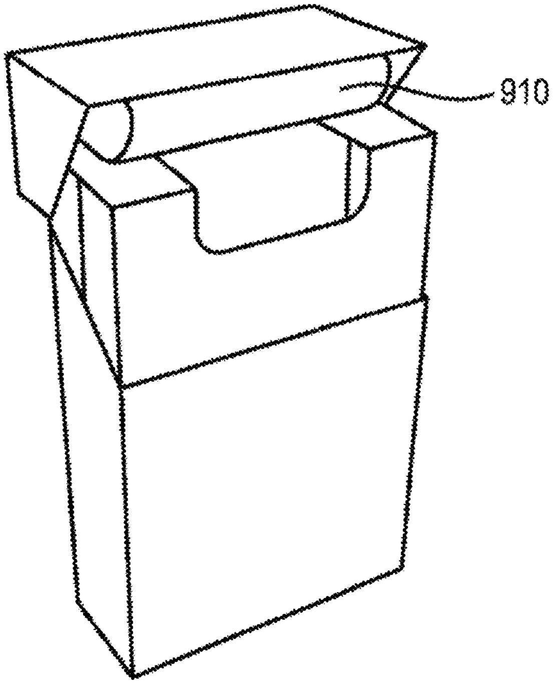

FIGS. 9*a* and 9*b* illustrate an assembled container in accordance with an embodiment of the present disclosure.

DETAILED DESCRIPTION

Reference will now be made in detail to the various embodiments, one or more examples of which are illustrated in each figure. Each example is provided by way of explanation and is not meant as a limitation. For example, features and/or method steps illustrated or described as part of one embodiment and/or method can be used on or in conjunction with other embodiments and/or method steps to yield yet further embodiments or methods. It is intended that the present disclosure includes such modifications and variations.

Embodiments of the present disclosure are directed to a box blank useful for forming a container for consumer goods having rigid inner and outer boxes. The outer box has a hinged lid that opens and closes to allow access the inner box. The inner box has an opening for accessing the consumer goods. The opening is covered by a re-sealable pull-tab. An inner surface of the hinged lid being arranged to rotate about a fold line based on a tension force applied to the inner surface via the pull tab when the hinged lid is opened and closed. The inner box also has an inner liner including at least a layer of paper or other suitable material as desired. According to an embodiment, the re-sealable pull-tab has one or more layers where an innermost layer is composed of foil, paper, bundle wrap, or any combination thereof as desired. According to another embodiment the re-sealable pull-tab includes at least one vent that allows air trapped under the releasable pull-tab to escape when the inner box is sealed or re-sealed. The pull-tab can be permanently connected to the inner box and the inner surface of the hinged lid. The container described herein provides several advantages such as an improved barrier and a simplified opening process designed to eliminate waste and one or more package opening steps. The arrangement of the re-sealable pull-tab prevents spillage of the product when the package is accessed the first time. The container of the present disclosure also provides a more durable package by protecting the product from physical damage while the product is in use and a less expensive packaging solution as fewer pieces of equipment are needed to make the package. Moreover, the package assembly can be performed faster and with fewer material components over known re-sealable packaging designs.

Figure 1:
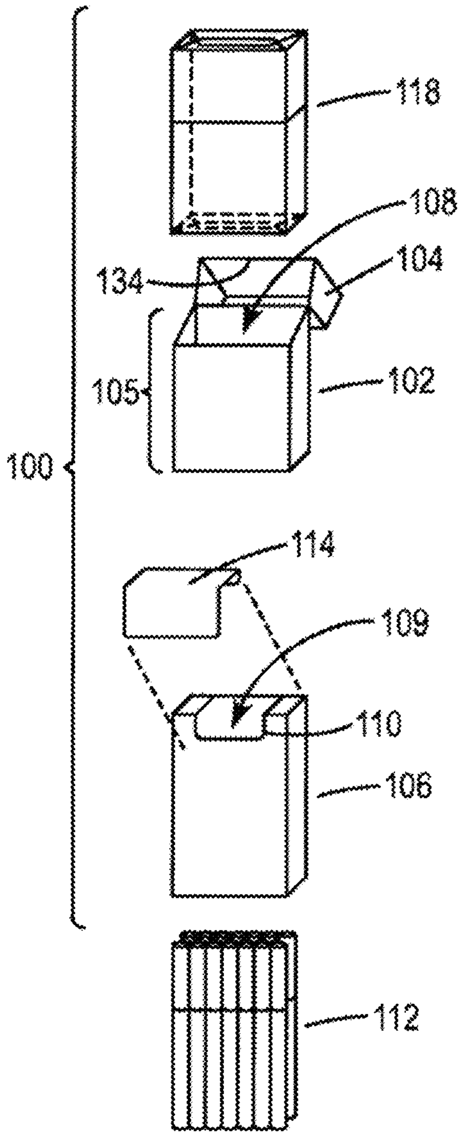

FIG. 1 illustrates a layout of a container for consumer goods in accordance with an embodiment of the present disclosure. As shown in FIG. 1, the container 100 includes a rigid outer box 102 having a hinged top 104 configured to provide access to a rigid inner box 106 and having a body 105 within which the inner box 106 is deposited. The inner box 106 has an opening 110 configured to provide access to consumer goods 112 stored or contained within an inner volume 109. The inner box 106 is of sufficient size to slidably and snugly fit within an inner volume 108 of the outer box 102. The inner box 106 can be securely held within the outer box 102 via contact friction between the surfaces of the inner box 106 and outer box 102. A pull tab 114 is arranged to cover the opening 110.

Figure 2A:
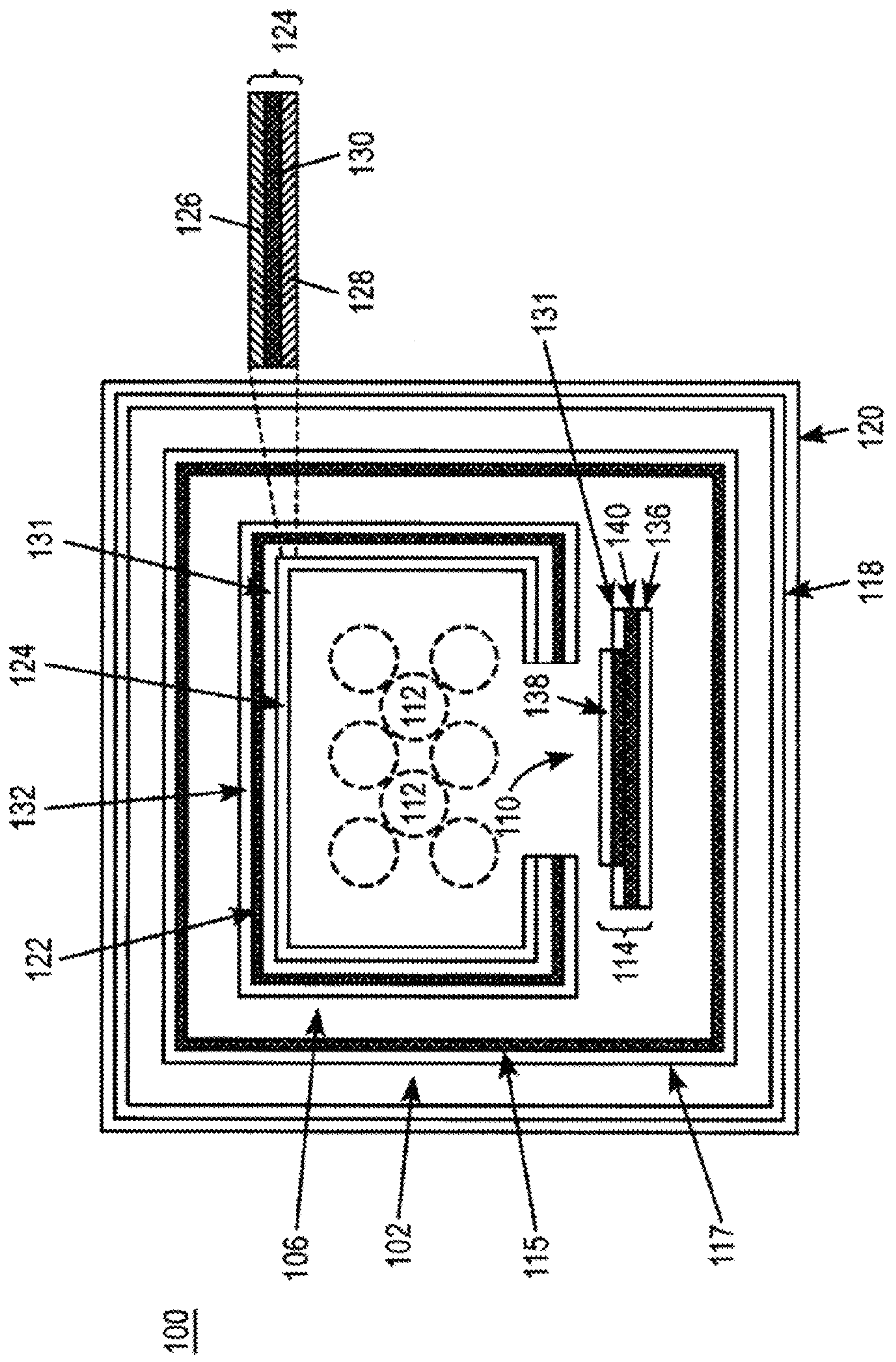

FIG. 2*a* illustrates a first perspective view of a layer structure of the container in accordance with an embodiment of the present disclosure. As shown in FIG. 2*a*, the outer box 102 includes one or more layers. A first layer 115 can be formed of a rigid material including cardboard, paperboard, or any other suitable material as desired. According to an embodiment, the first layer 115 can be formed of Promina SBS C1S Paperboard. According to another embodiment, the first layer 115 can be embossed with a design, lettering, pattern, and/or symbol as desired. A second layer 117 can include an ink, varnish, metallization, or other suitable material for product identification. When the container 100 is fully assembled, the outer box 102 can be wrapped with a third layer 118, such as a polypropylene film. The third layer 118 can include a tear tape 120 that allows for tearing open the polypropylene film 118.

The inner box 106 can include a plurality of layers. A first layer 122 can be formed of a rigid material such as cardboard, paperboard, or any other suitable material as desired. For example, according to an embodiment the first layer 122 can be formed of Promina SBS Board stock. A second layer 124 of the inner box 106 can include one or more layers formed as a bundle wrap. For example, the second layer 124 can include a foil layer 126 and a paper layer 128 as an inner liner bound by an adhesive 130. The paper layer 128 is the layer closest to or in contact with the consumer goods 112 stored in the inner box 106. According to an embodiment, the adhesive 130 used to bind the layers of the bundle wrap can include at least sodium silicate or any other suitable material as desired. The first layer 122 and the second layer 124 of the inner box 106 can also be bound to each other via an adhesive 131, such as a polyvinyl alcohol (PVA) based adhesive.

In accordance with another embodiment, the inner box 106 can also include a third layer 132 formed on a surface of the first layer 122. For example, the third layer 132 can include a polypropylene film or a metallized polyester (MET) material such that the layer structure of the inner box 106 includes bundle wrap/board/film or bundle wrap/board/MET, and more particularly the layer structure includes paper/foil/board/film or paper/foil/board/MET.

Figure 2B:
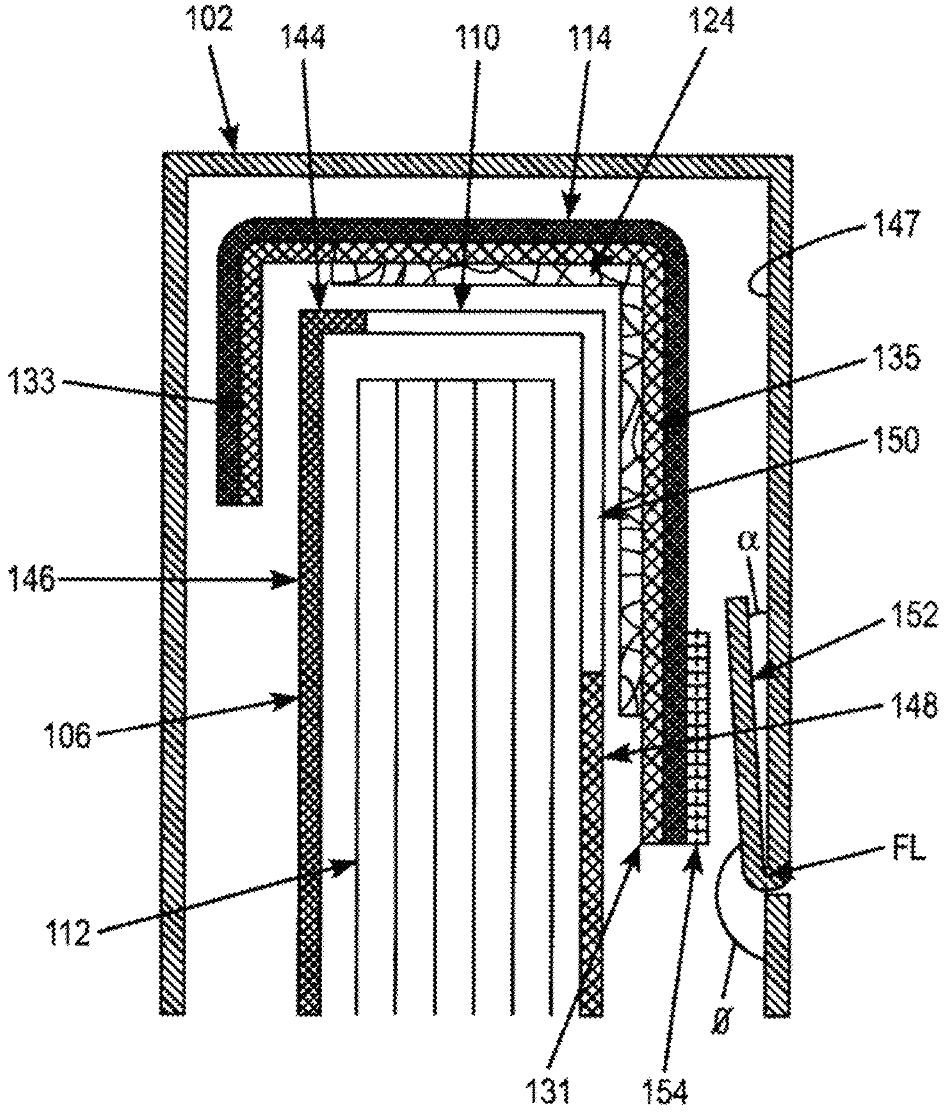

The pull tab 114 includes an adhesive layer 131 for adhering the pull tab 114 to the inner box 106 and a permanent adhesive layer 154, shown in FIG. 2*b*, that attaches the pull tab 114 to an inner surface 134 of the hinged lid 104 of the outer box 102. The pull tab 114 can also include a plurality of layers comprising a polymer material 136, a paper layer 138, and an adhesive layer 140 disposed between the polymer material 136 and the paper layer 138.

FIG. 2*b* illustrates a second perspective view of the layer structure of the container in accordance with an embodiment of the present disclosure. As shown in FIG. 2*b*, the adhesive layer 131 of the pull tab 114 includes a permanent adhesive area 133 and a non-permanent (e.g., re-sealable) adhesive area 135. The permanent adhesive area 133 can be arranged to extend from a top surface 144 of the inner box 106 to a rear surface 146 of the inner box 106. The non-permanent adhesive area 135 surrounds an adhesive-free region (not shown) of the adhesive layer 131, and is arranged to contact portions of the top surface 144 and a front surface 148 of the inner box 106 that border the opening 110.

The outer box 102 includes a front flap 152 that is adhered to the pull-tab 114 via a permanent adhesive 154. The front flap 152 can be folded about a fold line FL so that it forms the inner surface 134 of the hinged lid 104 to which the pull tab 114 is attached. It should be understood that the material properties of the outer box 102 provide that once folded the front flap 152 can be spaced from the surface of the outer box at an angle $\alpha$, where $0<\alpha<90°$. The opposite side of front flap 152 is not adhered to the hinged lid 104, which allows the front flap 152 to freely move (e.g., rotate) about the fold line FL when a tension force between the front flap and the pull tab 114 is generated during opening and closing of the hinged lid 104. For example, the tension force applied to the front flap 152 during opening of the hinged lid 104 causes the front flap 152 to move about the fold line FL, which results in the pull-tab 114 gradually peeling away from the top and front surfaces 144, 148 of the inner box 106 along a length of the non-permanent adhesive area 135 to fully uncover the opening 110. As the hinged lid 104 is closed, the tension force applied to the front flap 152 results in the pull-tab 114 gradually rolling onto the top and front surfaces 144, 148 of the inner box 106 to re-establish the seal and fully cover the opening 110. According to an embodiment, the front flap can move (e.g., rotate) about the fold line FL within an angle $\phi$, where $0<\phi<90°$.

According to another embodiment, the front flap 152 can be adhered to a back surface 147 of the hinged lid 104. In this arrangement the pull tab 114 follows the contour of the hinged lid 104 such that when the hinged lid 104 is opened, a substantial portion (e.g., greater than half the length) of the pull-tab 114 is instantly pulled away from the top and front surfaces 144, 148 of the inner box 106. In addition, when the hinged lid 104 is closed, a substantial portion (e.g., greater than half the length) of the pull-tab 114 is instantly pressed onto the top and front surfaces 144, 148 of the inner box 106.

Figure 3A:
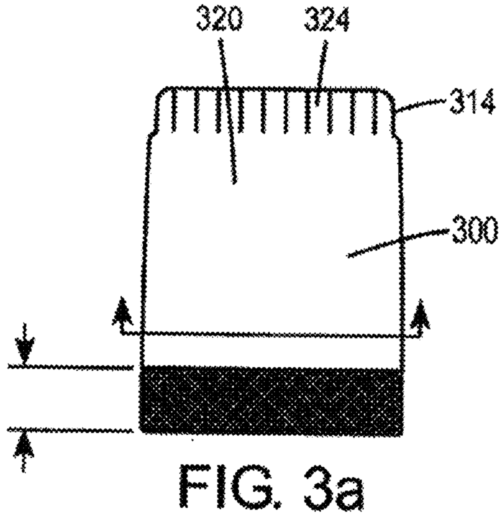
Figure 3B:
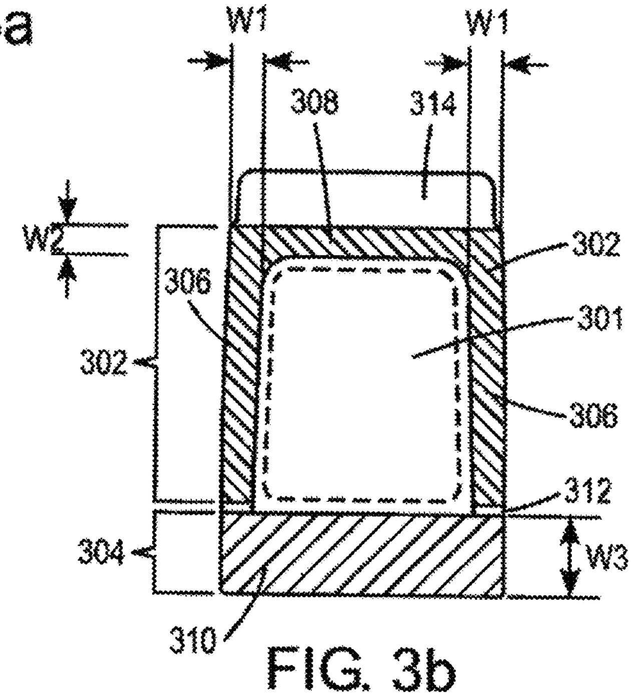
Figure 3C:
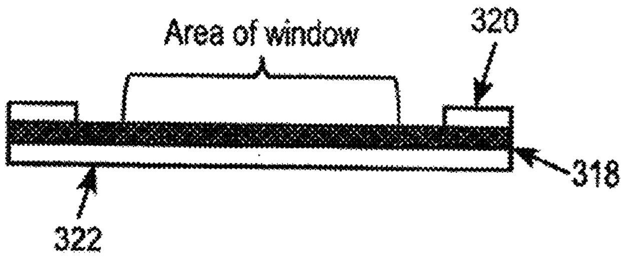

FIGS. 3*a*-3*c* illustrate a first pull tab of the container in accordance with an embodiment of the present disclosure. As shown in FIG. 3, the pull tab 300 can include an adhesive-free area 301 which overlies opening 110 and can form a window if the pull tab is made of a transparent polymer material, a first adhesive area 302, and a second adhesive area 304. The first adhesive area 302 and the second adhesive area 304 can be formed on a lower surface or inner box-side surface of the pull-tab 300. The pull-tab can be formed in any desired shape or size sufficient to fully cover and seal the opening 110 of the inner box 106 when the outer box 102 is closed. The pull-tab 300 can be formed from a single layer of polymer material such as PET or other suitable material such as a multi-layer laminate as desired. According to an embodiment, the pull-tab 300 can be formed of a 2 mils thick piece of PET. The adhesive-free area 301 is arranged approximately in a central region of the pull-tab 300 and aligned to fully cover the opening 110 when the pull tab 300 is adhered to the inner box 106. For example, left and right edge regions 306 located on opposites sides of the adhesive-free area 301 are of approximately the same width W1. A width W2 of a bottom edge region 308 located below the adhesive-free area 301 can be larger than a width W3 of a top edge region 310 above the adhesive-free area 301. The first adhesive area 302 includes a re-sealable adhesive film formed on the bottom edge region 308, the left and right edge regions 306, and the top edge region 310 of the pull tab 300, which surround the adhesive-free area 301. The re-sealable adhesive can include an ultra violet (UV) cured material, rubber based material, or a solvent based material. The second adhesive area 304 includes the top edge region 310 of the pull tab 300. The second adhesive portion 304 includes a permanent adhesive, which can be formed from UV-cured, rubber-based, or solvent-based materials.

The pull-tab 300 includes a vent 312 that extends longitudinally from at least one of the left or right edge regions 306 of the adhesive-free area 301. The vent 312 is formed by an adhesive-free gap configured to allow the release of air located under the pull-tab 300 when the pull-tab 300 seals or re-seals the opening 110 as the hinged top 104 of the outer box 102 is closed. The pull-tab 300 also includes a lip 314 on a bottom edge 316 of the bottom edge region 308. The lip 314 can have permanent adhesive 324 on an outer surface 320 to adhere to the front flap 152 of the hinged top 104 of the outer box 102.

As shown in FIG. 3*c*, the pull tab 300 can include a plurality of layers. A first layer 318 can be formed of polyethylene terephthalate (PET). A second layer 320 can be formed on the first layer 318 and includes adhesives applied to form the first and second adhesive portions 302, 304 already discussed. As discussed in FIG. 3*a*, the second layer 320 can be applied such that an adhesive-free region 301 is established. A third layer 322 can be formed on an opposite side of the first layer 318, and include an ink or other suitable print material as desired.

Figure 4A:
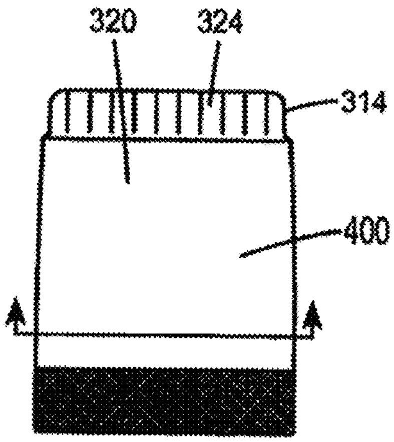
Figure 4B:
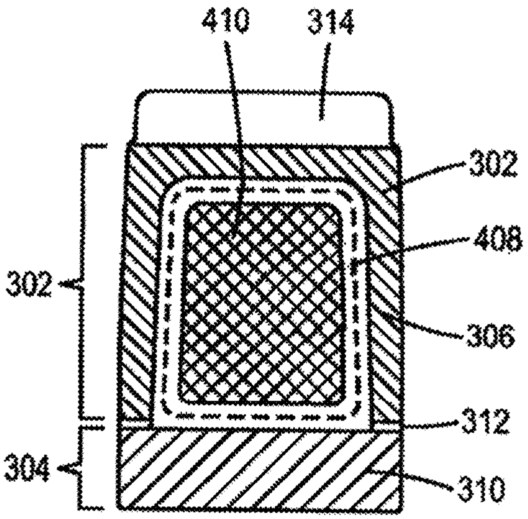
Figure 4C:
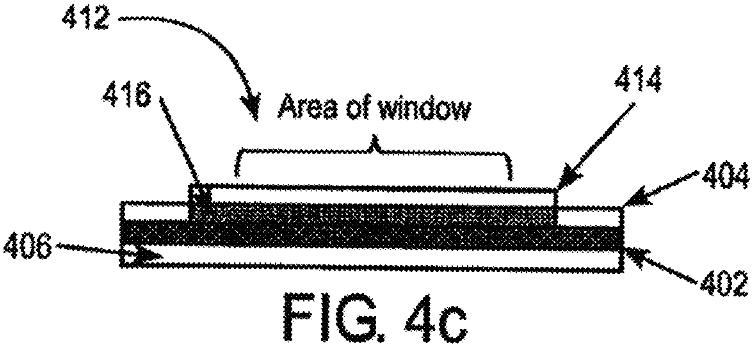

FIGS. 4*a*-4*c* illustrate a second pull tab of the container in accordance with an embodiment of the present disclosure. A pull tab 400 can have substantially the same planar dimensions as the first pull tab 300 of FIG. 3. The pull tab 400 can include a plurality of layers defined by the first, second, and third layers 402, 404, 406, which correspond to layers 318, 320, and 322, respectively, of FIG. 3. As shown in FIGS. 4*b* and 4*c*, the pull-tab 400 can further include a fourth layer 408. The fourth layer 408 can be formed of a piece of bundle wrap 414 sized to fully cover and extend slightly past edges of opening 410 in the inner box 106. Instead of an adhesive-free area 301 as in FIG. 3*c*, the adhesive covers substantially the entire inner surface 412 or product side of the pull tab 400. The fourth layer 408 can be adhered to the pull tab 400 via a suitable permanent adhesive 416; examples of which are discussed herein.

Figure 5:
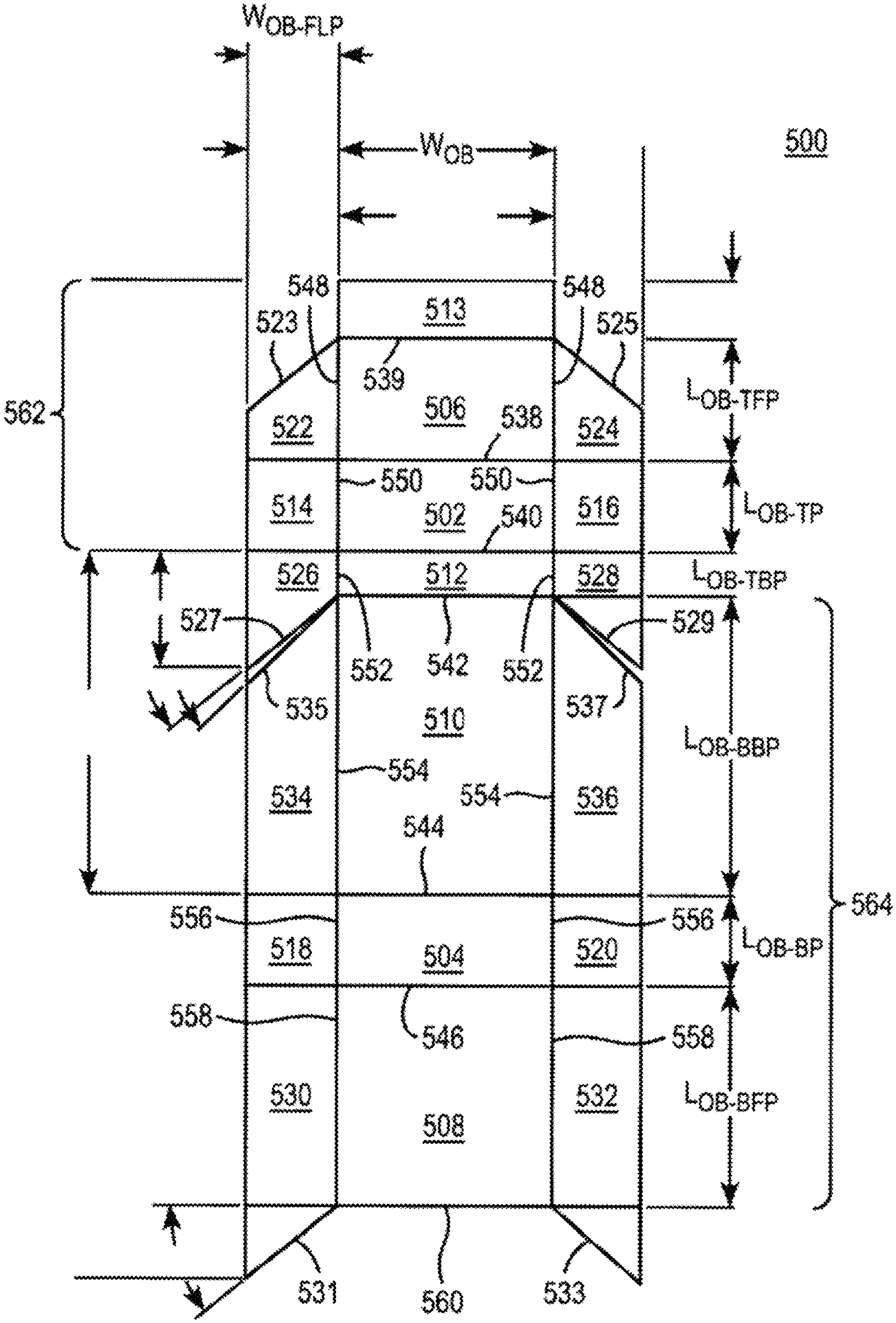
FIG. 5 illustrates a planar view of an outer box blank of the container in accordance with an embodiment of the present disclosure.

FIG. 5 illustrates a planar view of an outer box blank of the container in accordance with an embodiment of the present disclosure. As shown in FIG. 5, the blank 500 for forming outer box 102 includes a top panel 502, a bottom panel 504, a top front panel 506, a bottom front panel 508, a bottom back panel 510, and a top back panel 512. The top panel 502 includes a front flap 513. The top panel 502 and the bottom panel 504 include left and right dust flaps. The top panel 502 includes a left dust flap 514 and a right dust flap 516, and the bottom panel 504 includes a left dust flap 518 and a right dust flap 520. An upper section 562 of the outer box blank 500 includes the top panel 502, the top back panel 512, and the top front panel 508 and their associated side and dust flaps are configured to form the hinged top 104 of the assembled outer box 102 when folded. A lower section 564 of the outer box blank 500 includes the bottom panel 504, the bottom front panel 506, the bottom back panel 510 and their associated side and dust flaps discussed below are configured to form the body 105 of the assembled outer box 102 when folded.

The top back panel 512, the bottom front panel 508, and the bottom back panel 510 include left and right flaps. For example, the top front panel 506 includes a left side flap 522 and a right side flap 524; the top back panel 512 includes a left side flap 526 and a right side flap 528; the bottom front panel 508 includes a left side flap 530 and a right side flap 532; and the bottom back panel 510 includes a left side flap 534 and a right side flap 536.

Each panel of the outer box 102 and the associated left and right flaps are separated from an adjacent panel and its associated left and right flaps by a transverse fold line. The front flap 513 and the top front panel 506 are separated by transverse fold line 539. The top front panel 506, the left side flap 522, and the right side flap 524 are separated from the top panel 502, the left dust flap 514, and the right dust flap 516, respectively, by transverse fold line 538. The top panel 502, the left dust flap 514, and the right dust flap 516 are separated from the top back panel 512, the left side flap 526, and the right side flap 528, respectively, by transverse fold line 540. The top back panel 512, the left side flap 526, and the right side flap 528 are separated from the bottom back panel 510, the left side flap 534, and the right side flap 536, respectively, by transverse fold line 542. The bottom back panel 510, the left side flap 534, and the right side flap 536 are separated from the bottom panel 504, the left dust flap 518 and the right dust flap 520, respectively, by transverse fold line 544. The bottom panel 504, the left dust flap 518, and the right dust flap 520 are separated from the bottom front panel 508, the left side flap 530, and the right side flap 532, respectively, by transverse fold line 546.

Each side flap and dust flap of the outer box 102 is separated from the associated and adjacent panel by a longitudinal fold line. The top front panel 506 is separated from the left and right side flaps 522, 524 by longitudinal fold lines 548. The right side flap 524 has a pre-cut edge 525 that extends at an angle of approximately −45° from the transverse fold line 539. The left side flap 522 has a pre-cut edge 523 that extends at an angle of approximately −135° from the transverse fold line 539. The top panel 502 is separated from the left and right dust flaps 514, 516 by longitudinal fold lines 550. The top back panel 512 is separated from the left and right side flaps 526, 528 by longitudinal fold lines 552. The left side flap 526 has a pre-cut edge 527 that extends at an angle of approximately −50° from the transverse fold line 542. The right side flap 528 of top back panel 512 has a pre-cut edge 529 that extends at an angle approximately −140° from the transverse fold line 542. The bottom back panel 510 is separated from the left and right side flaps 534, 536 by longitudinal fold lines 554. The left side flap 534 has a pre-cut edge 535 that extends at an angle of approximately −45° from the transverse fold line 542. The right side flap 536 of the bottom back panel 510 has a pre-cut edge 537 that extends at an angle of approximately −135° from the transverse fold line 542. The bottom panel 504 is separated from the left and right dust flaps 518, 520 by longitudinal fold lines 556. The bottom front panel 508 is separated from the left and right side flaps 530, 532 by longitudinal fold lines 558. The left side flap 530 and the right side flap 532 extend past an edge 560 of the bottom front panel 508. The left side flap 530 has a pre-cut edge 531 that extends at approximately −45°, and in an embodiment −39°, from the bottom edge 560 of the bottom front panel 508. The right side flap 532 a pre-cut an edge 533 that extends at approximately −135°, and in an embodiment −129°, from the edge 560 of the front panel 508.

The pre-cut angle of the flaps associated with the bottom front panel 508 and bottom back panel 510 are complementary to the pre-cut angle of the flaps associated with the top front panel 506 and the top back panel 512 so that a side surface of the hinged top of the outer box mates with a side surface of a body of the outer box when the outer box is in a closed state.

Figure 6:
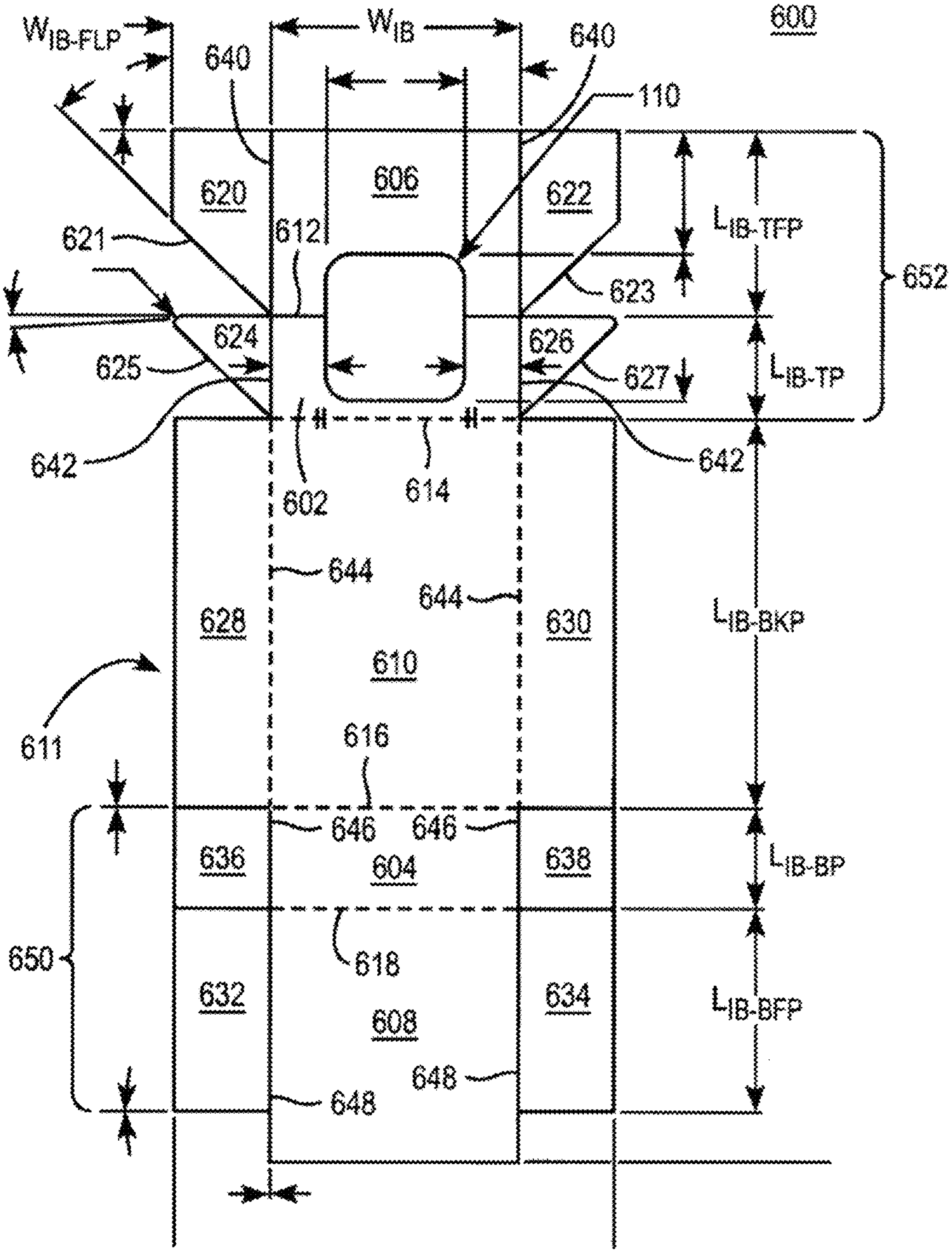
FIG. 6 illustrates a planar view of an inner box blank of the container in accordance with an embodiment of the present disclosure.

The outer box 102 has dimensions suitable for providing a snug fit for the inner box 106 when disposed within the outer box 102. The outer box 102 has a width $W_{OB}$ that is common to each of the top panel 502, bottom panel 504, top front panel 506, bottom front panel 508, bottom back panel 510, and top back panel 512. The bottom back panel 510 has a length $L_{OB\text{-}BBP}$ that is substantially longer than the length of the top back panel ($L_{OB\text{-}TBP}$) 512. The sum of $L_{OB\text{-}BBP}$ and $L_{OB\text{-}TBP}$ is approximately equal to the length of a cigarette pack, e.g., the length of the inner box 106. The length of the bottom front panel ($L_{OB\text{-}BFP}$) 508 is substantially longer than the length of the top front panel ($L_{OB\text{-}TFP}$) 506. The sum of $L_{OB\text{-}BFP}$ and $L_{OB\text{-}TFP}$ is substantially equal to the sum of $L_{OB\text{-}BBP}$ and $L_{OB\text{-}TBP}$. According to an embodiment $L_{OB\text{-}BBP}$=75.10 mm, $L_{OB\text{-}TBP}$=11.40 mm, $L_{OB\text{-}BFP}$=55.5 mm, and $L_{OB\text{-}TFP}$=31.0 mm. The depth or thickness of the outer box 102 is equal to the width ($W_{OB\text{-}FLP}$) of the side and dust flaps and the length (e.g., shortest edge) of the top panel ($L_{OB\text{-}TP}$) 502 and bottom panel ($L_{OB\text{-}BP}$) 504. According to an embodiment $L_{OB\text{-}TP}$=$L_{OB\text{-}BP}$=$W_{OB\text{-}FLP}$=21.9 mm FIG. 6 illustrates a planar view of a blank for forming an inner box 106 of the container in accordance with an embodiment of the present disclosure. As shown in FIG. 6, the blank 600 for inner box 106 includes a top panel 602, a bottom panel 604, a top front panel 606, a bottom front panel 608, and a back panel 610. The opening 110 of the inner box extends across the top front panel 606 and the top panel 602. A surface 611 of the inner box blank can be substantially covered with a bundle layer. The surface 611 establishes the product side surface of the assembled inner box 106.

Each panel is separated from an adjacent panel by a transverse fold line. The top front panel 606 is separated from the top panel 602 by a transverse fold line 612. The top panel 602 is separated from the back panel 610 by a transverse fold line 614. The back panel 610 is separated from the bottom panel 604 by a transverse fold line 616. The bottom panel 604 and the bottom front panel 608 are separated by transverse fold line 618.

Each panel includes associated side flaps. The top front panel 606 includes a left side flap 620 and a right side flap 622. The left side flap 620 has a pre-cut edge 621 that extends at an angle of approximately 45° from the transverse fold line 612. The right side flap 622 has a pre-cut edge 623 that extends at an angle of approximately 135° from the transverse fold line 612. The top panel 602 includes a left side flap 624 and a right side flap 626. The left side flap 624 has a pre-cut edge 625 that extends at an angle of approximately 45° from the transverse fold line 614. The right side flap 626 has a pre-cut edge 627 that extends at an angle of approximately 135° from the transverse fold line 614. The back panel 610 includes left side flap 628 and a right side flap 630. The front panel 608 includes a left side flap 632 and a right side flap 634.

The bottom panel 604 includes a left dust flap 636 and a right dust flap 638.

The inner box 106 has dimensions suitable for storing a desired number (e.g., count) of consumer goods, which according to an embodiment are cigarette articles. The inner box 106 has a width $W_{IB}$ that equals the width of each of the top panel 602, bottom panel 604, top front panel 606, bottom front panel 608 and back panel 610. The back panel 610 has a height or length ($L_{IB\text{-}BKP}$) sufficient for enclosing the consumer goods. The sum of the lengths of the top front panel 606 ($L_{IB\text{-}TFP}$) and the bottom front panel ($L_{IB\text{-}BFP}$) 608 is equivalent to $L_{IB\text{-}BKP}$. According to an embodiment of the present disclosure, $L_{IB\text{-}BKP}$=83.6 mm, $L_{IB\text{-}TFP}$=27.2 mm, and $L_{IB\text{-}BFP}$=43.39 mm. The depth or thickness of the inner box 106 is established by the width $W_{IB\text{-}FLP}$ shared by each of the side and dust flaps and the length (e.g., shortest edge) of the top panel ($L_{IB\text{-}TP}$) 602 and bottom panel ($L_{IB\text{-}BP}$) 604. According to an embodiment, $L_{IB\text{-}TP}$=$L_{IB\text{-}BP}$=$W_{IB\text{-}FLP}$=20.55 mm.

According to embodiments of the present disclosure, a sum of lengths of the top back panel 512 and bottom back panel 510 of the outer box 102 is at least equal to a length of the back panel 610 of the inner box 106, where ($L_{OB\text{-}TBP}$+$L_{OB\text{-}BBP}$=$L_{IB\text{-}BKP}$), and in an embodiment the sum of lengths is greater, where ($L_{OB\text{-}TBP}$+$L_{OB\text{-}BBP}$>$L_{IB\text{-}BKP}$), so that the proper fit of the inner box 106 within the outer box 102 and closure of the hinged top 104 can be realized.

Each side and dust flap of the inner box 104 is separated from the associated and/or adjacent panel by a longitudinal fold line. The top front panel 606 is separated from the left and right side flaps 620, 622 by longitudinal fold lines 640. The top panel 602 is separated from left and right side flaps 624, 626 by longitudinal fold lines 642. The back panel 610 is separated from left and right side flaps 628, 630 by longitudinal fold lines 644. The bottom panel 604 is separated from left and right dust flaps 636, 638 by longitudinal fold lines 646. The bottom front panel 608 is separated from left and right side flaps 632, 634 by longitudinal fold lines 648.

FIGS. 7*a* and 7*b* are flow charts of a process for making the container in accordance with an embodiment of the present disclosure; and FIG. 8 illustrates a sequence of assembly states of the container according to the assembly process of FIGS. 7*a* and 7*b*. As shown in FIGS. 7*a* and 7*b*, the process includes a first step (S700) in which the inner box 102 is assembled from the inner box blank 600 by folding the left and right side flaps 628, 630 about the longitudinal fold lines so that they are substantially orthogonal to the back panel 610. In step S702, the dust flaps 636, 638 of the bottom panel 604 are folded over the longitudinal fold lines 646 so that they are substantially planar with the bottom panel 604. According to an embodiment, an adhesive can be applied to the dust flaps 636, 638 so that they adhere to the bottom panel 604 when folded. As shown in State 1 of FIG. 8, a lower section 650 including the bottom panel 604 and the bottom front panel 608 is folded about transverse fold line 616 so that it is substantially orthogonal to the bottom panel 604 (S704). The consumer goods or product is then placed into the area bounded by the left and right side flaps 628, 630 and the bottom panel 604 (S706). An upper section 652 including the top panel 602 and the top front panel 606 is folded about transverse fold line 614 so that the upper section 652 is substantially orthogonal to the back panel 610 (S708, State 2). The bottom front panel 608 is folded over transverse fold line 618 so that it is parallel with the back panel 610 (S710, State 3). The top front panel 606 is folded over transverse fold line 612 so that it is parallel with the back panel 610 and planar with the bottom front panel 608 (S712, State 4).

An adhesive can be applied to the left and right side flaps 624, 626 of the top panel 602. The left and right side flaps 624, 626 of the top panel 602 are folded over longitudinal fold lines 642 and adhere to the side flaps 628, 630 of the back panel 610 (S714, State 5). An adhesive can be applied to the side flaps 632, 634 of the bottom front panel 608 and to the left and right side flaps 620, 622 of the top front panel 606. The side flaps 632, 634 of the bottom front panel 608 are folded about longitudinal fold lines 648 and adhere to the left and right side flaps 628, 630, respectively, of the back panel 610 (S716, State 6). The left and right side flaps 620, 622 of the top front panel 606 are folded about longitudinal fold lines 640 and adhere to the left and right side flaps 628, 630, respectively, of the back panel 610 (S718, State 6). It is noted that the left and right side flaps 620, 622 of the top front panel 606 are planar with and do not overlap the side flaps 624, 626, respectively of the top panel 602 because of the pre-cut angles of their respective edges. The pull tab 114 is placed on the inner box 104 to cover the opening 110 (S720, State 7). In particular, the second adhesive portion 310 of the pull tab 114 adheres to the back panel 610 of the inner box 106. The pull tab 114 is then folded over the top of the inner box 106 so that the first adhesive portion 302 adheres to the left, right, and upper portions of the top panel 602 and top front panel 606 that surround the opening 110 (State 7).

The outer box 102 is assembled from the outer box blank 500 by folding the left and right side flaps 534, 536 of the bottom back panel 510 about longitudinal fold lines 554 so that the left and right side flaps 534, 536 are substantially orthogonal to the bottom pack panel 510 (S720). The left and right dust flaps 518, 520 of bottom panel 504 are folded over longitudinal fold lines 556 so that they are substantially planar with each other and parallel with the bottom panel 504 (S722, State 8). According to an embodiment, adhesive can be applied to the left and right dust flaps 518, 520 so that they adhere to the bottom back panel 510 when folded. A lower section 505 of the outer box 102 including the bottom panel 504 and the bottom front panel 508 is folded about transverse fold line 544 so that the lower section 505 is substantially orthogonal to the bottom back panel 510 (S724, State 8). The assembled inner box 106 is placed within the area of the outer box 102 bounded by the left and right side flaps 534, 536 and the bottom panel 504 (S726, State 9). The bottom front panel 508 is folded over transverse fold line 546 so that the panel is substantially parallel with the bottom back panel 510 (S728, State 10). An adhesive can be applied to the left and right side flaps 530, 532 of the bottom front panel 508. The side flaps 530, 532 are then folded about longitudinal fold lines 558 and adhere to the left and right side flaps 534, 536, respectively, of the bottom back panel 510 (S730).

An upper section 503 of the outer box 102 including the top panel 502 and the top front panel 506 is folded about transverse fold line 540 so that the upper section 503 is substantially orthogonal to the bottom back panel 510 (S732, State 10). The left and right side flaps 526, 528 of the top back panel 512 are folded about longitudinal fold lines 552 so that they are planar with the left and right side flaps 534, 536, respectively, of the bottom back panel 510 (S734). It is noted that the angled edges of the left and right side flaps 534, 536 of the bottom back panel 510 and the angled edges of the left and right side flaps 526, 528, respectively, of the top back panel 512 are pre-cut so that they do not overlap and allow for opening of the hinged top 104 of the outer box 102. The top front panel 506 is folded about transverse fold line 538 so that the top front panel 506 is parallel with the bottom back panel 510 and planar with the bottom front panel 508 (S736, State 11). An adhesive is applied to the left and right side flaps 522, 524 of the top front panel 506. The left and right side flaps 522, 524 of the top front panel 506 are then folded about longitudinal fold lines 548 and adhere to the folded left and right side flaps 526, 528, respectively of the top back panel 512 (S738, State 11). Attaching the bottom edge region 308 of the pull tab 114 having the permanent adhesive to the front flap 513 and folding the front flap 513 about transverse fold line 539 so that the front flap 513 establishes the inner surface 134 of the hinged lid 104 to which the pull tab 114 is attached (S740, State 11). According to another embodiment, the front flap 513 can be adhered to a back surface 147 of the top front panel 506 after being folded about the transverse fold line 539.

FIGS. 9*a* and 9*b* illustrate an assembled container in accordance with an embodiment of the present disclosure. As shown, the assembled container 900 includes the rigid outer box 902 and the rigid inner box 904. The outer box 902 includes the hinged lid 906 for accessing the inner box 904 and the inner box 904 includes an opening 908 for accessing the consumer goods (not shown). The container 900 also includes a pull-tab 910 that is affixed to the outer box 902 and inner box 904 via areas having areas of permanent and re-sealable adhesives. The pull-tab 910 is affixed to an inner surface 912 of the hinged lid 906 established by the folded front flap 513 of the outer box blank 500 via the permanent adhesive. When the hinged lid 906 is closed, the pull-tab 910 fully covers the opening 908 of the inner box 904 by adhering to a surface of the inner box 904 surrounding the opening 908 via the re-sealable adhesive. Alternatively, when the hinged lid 906 is opened, the pull-tab 910 fully uncovers the opening 908 and remains adhered to the hinged lid 906 of the outer box 902 and to the inner box 904 via the areas having the permanent adhesive.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of assembling a container for consumer goods, the method comprising:

disposing a pull tab over an opening of an inner box, the pull tab including, a flexible sheet including a first surface;

a first adhesive in a first region of the first surface of the flexible sheet; and a second adhesive in a second region of the first surface of the flexible sheet, the second adhesive being different from the first adhesive, and the first region of the first surface of the flexible sheet and the second region of the first surface of the flexible sheet being separated by an adhesive-free gap.

2. The method of claim 1, wherein the flexible sheet further includes a second surface opposing the first surface, and the second surface includes a third adhesive in a third region.

3. The method of claim 2, wherein the third adhesive is different from the second adhesive.

4. The method of claim 3, wherein the third adhesive includes a permanent adhesive.

5. The method of claim 3, wherein the method further comprises:

preparing the pull tab, the preparing of the pull tab including, disposing a plurality of dots in the third region of the second surface of the flexible sheet, each of the plurality of dots including the third adhesive.

6. The method of claim 1, wherein the method further comprises:

preparing the pull tab, the preparing of the pull tab including, disposing the first adhesive in the first region of the first surface of the flexible sheet.

7. The method of claim 1, wherein the method further comprises:

preparing the pull tab, the preparing of the pull tab including, disposing the second adhesive in the second region of the first surface of the flexible sheet.

8. The method of claim 1, wherein the method further comprises:

preparing the pull tab, the preparing of the pull tab including, disposing a plurality of triangles in the second region of the first surface of the flexible sheet, each of the plurality of triangles including the second adhesive.

9. The method of claim 8, wherein the plurality of triangles cover 40% to 60% of a total surface area of the first surface.

10. The method of claim 8, wherein the plurality of triangles includes triangles of different sizes.

11. The method of claim 1, wherein the first adhesive includes a permanent adhesive.

12. The method of claim 1, wherein the second adhesive includes a re-stick adhesive.

13. The method of claim 1, wherein the method further comprises:

preparing the inner box, the inner box including rigid panels separated by fold lines, the inner box including, a top front panel separated from a top panel by a first transverse fold line, a back panel separated from the top panel by a second transverse fold line, a bottom panel separated from the back panel by a third transverse fold line, and a bottom front panel separated from the bottom panel by a fourth transverse fold line.

14. The method of claim 13, wherein the disposing of the pull tab comprises:

contacting the second adhesive to the top panel and the top front panel.

15. The method of claim 13, wherein the back panel is attached to a left back side flap and a right back side flap along a first longitudinal fold line and a second longitudinal fold line, respectively, and the bottom panel is attached to a left bottom panel side flap and a right bottom panel side flap along a third longitudinal fold line and a fourth longitudinal fold line, respectively, and the preparing the inner box comprises:

folding a left back panel side flap and a right back panel side flap along a fifth longitudinal fold line and a sixth longitudinal fold line, respectively, such that the left back side flap and the right back side flap are orthogonal to the back panel;

folding the left bottom panel side flap and the right bottom panel side flap along a seventh longitudinal fold line and an eighth longitudinal fold line, respectively, so that the left bottom panel side flap and the right bottom panel side flap are planar with the bottom panel;

folding the bottom panel about the third transverse fold line so that the bottom panel is orthogonal to the back panel;

folding the top panel about the second transverse fold line;

folding the bottom front panel about the fourth transverse fold line so that the bottom front panel is parallel with the back panel; and folding the top front panel about the first transverse fold line so that the top front panel is parallel with the back panel and planar with the bottom front panel.

16. The method of claim 15, the method further comprising:

applying a third permanent adhesive to the left bottom panel side flap and the right bottom panel side flap.

17. The method of claim 15, the method further comprising:

placing consumer goods or products into an area bounded by the left back panel side flap, the right back panel side flap, and the bottom panel.

18. The method of claim 1, wherein the first surface of the pull tab includes a liner.

19. The method of claim 1, wherein the flexible sheet includes a polymer film.

20. The method of claim 1, wherein the flexible sheet is rectangular with rounded corners.

* * * * *